United States Patent
Browne et al.

(10) Patent No.: US 7,082,194 B2
(45) Date of Patent: Jul. 25, 2006

(54) FEEDBACK CONTROL OF CALL PROCESSING IN A COMMUNICATION SYSTEM SWITCH WITH SCRIPT SELECTION BASED ON ASSIGNED WEIGHTINGS

(75) Inventors: Nigel A. Browne, Jersey City, NJ (US); Steven M. Silverstein, West Long Branch, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 382 days.

(21) Appl. No.: 10/251,136

(22) Filed: Sep. 20, 2002

(65) Prior Publication Data

US 2004/0057571 A1    Mar. 25, 2004

(51) Int. Cl.
*H04M 3/523* (2006.01)
*H04Q 3/64* (2006.01)

(52) U.S. Cl. .............................. 379/265.02; 379/266.07
(58) Field of Classification Search ................ 379/265.01–266.1, 266.04, 266.07, 309, 379/219, 220.01
See application file for complete search history.

(56) References Cited

U.S. PATENT DOCUMENTS 5,335,268 A * 8/1994 Kelly et al. ............. 379/112.05
5,740,233 A * 4/1998 Cave et al. ............. 379/112.06
5,740,238 A * 4/1998 Flockhart et al. ...... 379/266.05
6,751,310 B1 * 6/2004 Crossley ................ 379/266.07

OTHER PUBLICATIONS

U.S. Appl. No. 10/072,063, filed Feb. 6, 2002, N.A. Browne et al., entitled "Call Processing with Statistical Weighting of Scripts in a Communication System Switch."

* cited by examiner

*Primary Examiner*—Harry S. Hong

(74) *Attorney, Agent, or Firm*—Ryan, Mason & Lewis, LLP

(57) ABSTRACT

Techniques are disclosed for processing communications in a communication system switch in which one or more processing scripts are selected for application to one or more communications in accordance with weightings assigned to at least a subset of the processing scripts. Measurements are determined for one or more switch resources, such as central processing unit (CPU) utilization, associated with processing of the communications using the processing scripts, and the processing script weightings are periodically adjusted in accordance with the determined measurements. The system resource measurements may be generally characterized as comprising resource limit measurements, business objective measurements, or other types of measurements. The invention facilitates the processing of communications in the system switch and provides improved efficiency and reliability.

12 Claims, 5 Drawing Sheets ns194 B2

FEEDBACK CONTROL OF CALL PROCESSING IN A COMMUNICATION SYSTEM SWITCH WITH SCRIPT SELECTION BASED ON ASSIGNED WEIGHTINGS

RELATED APPLICATION(S)

The present invention is related to the invention described in U.S. patent application Ser. No. 10/072,063 filed Feb. 6, 2002 in the name of inventors Nigel A. Browne and Stephen F. Okinow and entitled "Call Processing with Statistical Weighting of Scripts in a Communication System Switch," which is hereby incorporated by reference herein.

FIELD OF THE INVENTION

The invention relates generally to call processing in communication systems, and more particularly to systems in which calls or other communications are directed by a switch to or from telephones, computers or other types of user terminals.

BACKGROUND OF THE INVENTION

Conventional communication system switches include private branch exchanges (PBXs), automatic call distribution (ACD) systems, computer-telephony integration (CTI)-based systems, and other premises or enterprise-based call processing elements, as well as portions or combinations of these and other types of systems.

An important application of such switches is in a call center. Call centers distribute calls and other types of communications to available call-handling service agents in accordance with various predetermined criteria. In existing call center systems, the criteria for handling a call are often programmable by the operator of the system via a capability known as call vectoring. Typically, when the system detects that an agent has become available to handle a call, the system identifies the call-handling skills of the agent, usually in some order of priority, and delivers to the agent the longest-waiting call that matches the agent's highest-priority skill. This type of skills-based queuing allows each agent to be placed into a number of different service categories based on the skill types supported by that agent. Additional details regarding these and other call distribution techniques are described in, e.g., U.S. Pat. Nos. 5,740,238, 5,754,639 and 6,049,547, all of which are hereby incorporated by reference herein.

The implementation of call vectoring in a given communication system switch generally involves the use of a processing script, also referred to as a vector. Such a script may comprise a software program or suitable portion thereof having program instructions for directing the switch to apply particular processing operations to a given call when the script is invoked. In the call center context, the script may direct that a given call be queued to a certain agent, that particular announcements be played, and so on.

There are a number of significant problems with the conventional script processing approach in a communication system switch. One such problem is that the switch typically applies the same or a similar script to all incoming calls of a particular type or in a given processing application. This is inefficient in that it unduly limits the flexibility of the system in processing calls, increases script complexity, and requires that valuable switch processor cycles be expended for executing the script for every call.

As is apparent from the foregoing, a need exists for improved techniques for processing calls or other communications in a communication system switch.

SUMMARY OF THE INVENTION

The present invention provides techniques for feedback control of statistical weighting of processing scripts in a communication system switch.

In accordance with one aspect of the invention, measurements of switch resources associated with the processing of communications using statistically weighted processing scripts are determined, and these measurements are utilized in a feedback control arrangement to adjust the weightings assigned to the processing scripts.

The system resource measurements may be generally characterized as comprising resource limit measurements, business objective measurements, or other types of measurements. Example resource limit measurements include a processor utilization measurement, a link status measurement, a link utilization measurement and an internal system message queue length measurement. The link status and link utilization measurements may relate to links between the communication system switch and one or more associated adjuncts, such as computer-telephony integration (CTI) links, interactive voice response (IVR) links, etc., as well as or alternatively to internal communication links between elements of the switch itself. Example business objective measurements include a number of calls waiting measurement, an oldest call waiting measurement, an expected wait time measurement, a most idle agent measurement, and a per site queue length measurement.

In an illustrative embodiment, the measurement determination and weighting adjustment are implemented in a feedback path coupled between a communication processing element of the switch and a script selection element of the switch. More particularly, the weighting adjustment may be implemented at least in part in a vector directory number (VDN) selection element of the switch, in response to measurement-related input received from a statistical vector control mechanism element of the switch.

Advantageously, the invention significantly improves call processing efficiency and reliability in a communication system switch.

DETAILED DESCRIPTION OF THE INVENTION

Although the invention will be illustrated below in conjunction with the processing of calls in an exemplary communication system suitable for configuration as a call center, it is not limited to use with any particular configuration of system elements or communication processing application. Those skilled in the art will recognize that the disclosed techniques may be used in any communication system application in which it is desirable to provide improved script-based call processing in a system switch. For example, the disclosed techniques can be used with private-branch exchange (PBX) systems, automatic call distribution (ACD) systems, computer-telephony integration (CTI)-based systems, as well as in portions or combinations of these and other types of systems. In addition, the invention is applicable to the processing of incoming communications, outgoing communications or both.

The term "call" as used herein is therefore intended to include not only incoming or outgoing telephone calls but also non-telephonic communications such as voice-over-IP (VoIP) communications, session initiation protocol (SIP) communications, data transmissions, e-mail, facsimile, etc.

The term "switch" as used herein should be understood to include, by way of example and without limitation, a PBX, an enterprise switch, or other type of telecommunications system switching device, as well as other types of processor-based communication control devices such as servers, computers, adjuncts, etc.

Figure 1:
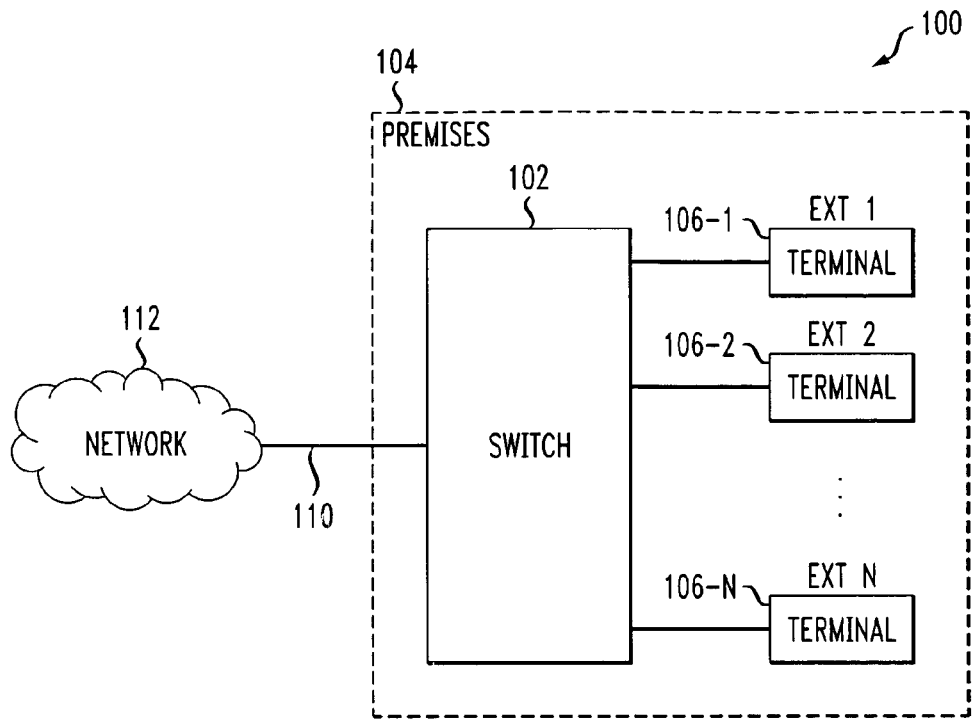
FIG. 1 shows an exemplary communication system in which the invention is implemented.

FIG. 1 shows an exemplary communication system 100 in which the invention is implemented. The system 100 includes a switch 102 which serves a premises 104 having a number of terminals 106-1, 106-2, . . . 106-N. Each of the terminals 106-1, 106-2, . . . 106-N corresponds to one of a set of internal extensions Ext1, Ext2, . . . ExtN as shown. These extensions are referred to herein as "internal" in that they are extensions within the premises 104 that are directly serviced by the switch. More particularly, these extensions correspond to conventional terminal endpoints serviced by the switch, and the switch can direct incoming calls to and receive outgoing calls from these extensions in a conventional manner.

In a call center application of the system 100, each of the terminals 106-1, 106-2, . . . 106-N may correspond to an agent workstation. Such a workstation may comprise a computer having telephony capability, a telephone station with an associated video display terminal, etc.

Although switch 102 is shown as associated with the premises 104 in this embodiment, the invention does not require that the switch 102 be so configured. Alternatively, the switch 102 may be implemented as a distributed switch which includes switch processing elements at multiple locations, networked together in a conventional manner.

The term "switch" as used herein should be understood to include a PBX, an enterprise switch, or other type of telecommunications system switch, as well as other types of processor-based communication control devices such as servers, computers, routers, adjuncts, etc. The term is also intended to include a distributed switch such as that referred to above.

By way of example, the switch 102 in the illustrative embodiment may be implemented as an otherwise conventional DEFINITY® Enterprise Communication Service (ECS) communication system switch available from Avaya Inc. of Basking Ridge, New Jersey, USA. Additional details regarding this type of switch may be found in, e.g., DEFINITY® ECS, Release 9, Administration for Network Connectivity, Issue 2, Document No. 555-233-504, November 2000, which is incorporated by reference herein. Other types of known switches may be configured to operate in accordance with the techniques of the invention. The conventional aspects of such switches are well known in the art and therefore not described in detail herein.

Another example switch suitable for use in conjunction with the present invention is the MultiVantage™ communication system switch, also available from Avaya Inc.

The switch 102 may also be referred to herein, by way of example, as an Avaya call processing (ACP) device.

The terminals 106 may be wired desktop telephone terminals or any other type of terminals capable of communicating with the switch 102. The word "terminal" as used herein should therefore be understood to include not only wired or wireless desktop telephone terminals, but also other types of processor-based communication devices, including but not limited to mobile telephones, personal computers, personal digital assistants (PDAs), etc.

The switch 102 is also coupled via one or more trunk lines 110 to a network 112. The network 112 may comprise, e.g., a public switched telephone network (PSTN). The trunk lines 110 carry incoming calls from the network 112 to the switch 102 for processing, and carry outgoing calls from the switch 102 to the network 112. The network 112 may also or alternatively comprise a computer network such as the Internet, a wireless cellular network, a satellite network, as well as portions or combinations of these and other networks.

It should be noted that the invention does not require any particular type of information transport media between switch 102, network 112 and terminals 106, i.e., the invention may be implemented with any desired type of transport medium as well as combinations of different types of transport media.

The switch 102 may be connected to one or more external endpoints, e.g., external terminals or system processing elements, via network 112 or other suitable communication channel(s).

It should be emphasized that the configuration of the switch, endpoints and other elements of the system 100 is for purposes of illustration only, and should not be construed as limiting the invention to any particular arrangement of elements. For example, the system 100 may include additional endpoints, and may utilize other types and arrangements of switching and routing elements.

Figure 2:
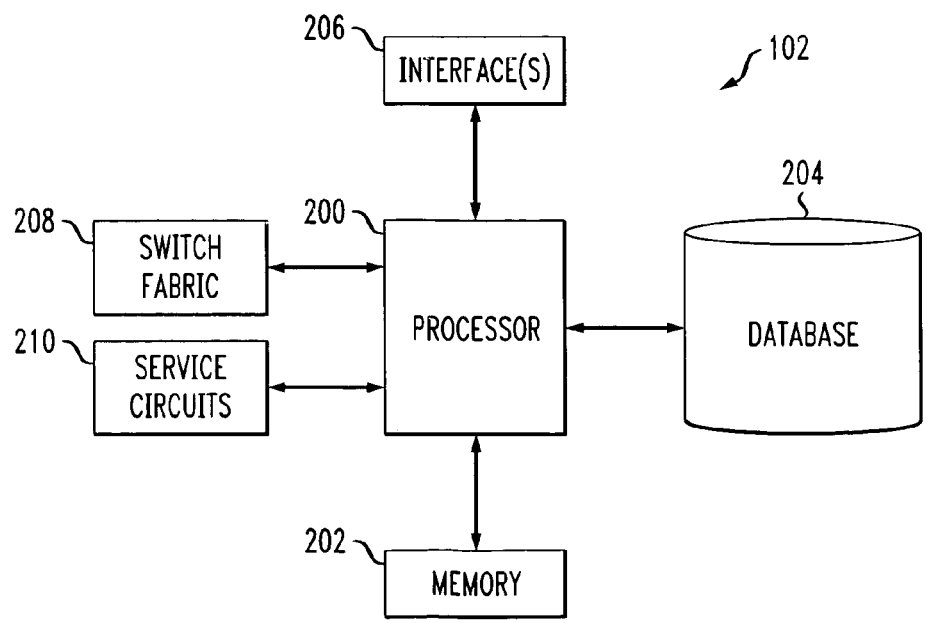
FIG. 2 is a block diagram showing one possible implementation of a switch of the FIG. 1 system.

FIG. 2 shows a more detailed view of one possible implementation of the switch 102 in the system of FIG. 1. The switch 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor, as well as various portions or combinations of such elements. The memory 202 may comprise a random access memory (RAM), a read-only memory (ROM), a disk-based storage device, or combinations of these and other types of memory devices.

The processor 200 operating in conjunction with the memory 202 executes one or more software programs for providing script processing and other functions within the switch 102. Such programs may be stored in memory 202, or another storage device accessible to the switch 102, and executed by processor 200 in a conventional manner.

The database 204 may be, e.g., an optical or magnetic disk-based storage device, or other conventional storage device associated with or otherwise accessible to the switch 102. The database 204 may be used to store, e.g., feature assignments to particular feature buttons or codes, directory number assignments to corresponding call appearances or direct facility termination keys, access restrictions, and other administrative information regarding the configuration of the system 100, as well as other types of information.

The service circuits 210 may include tone generators, announcement circuits, etc. These circuits and the interfaces 206 are controlled by processor 200 in implementing call processing functions in the switch 102.

The switch 102 may include additional elements which are omitted from FIG. 2 for simplicity and clarity of illustration. For example, the switch may include a port card for each type of user terminal associated therewith. In addition, it will be appreciated by those skilled in the art that the switch 102 may be configured to support multiple user terminals of different types, e.g., wired deskset terminals, wireless deskset terminals, personal computers, video telephones or other advanced terminals, etc.

Also associated with the switch 102 may be an administrator terminal (not shown) which is used to program the operation of the switch 102 during a system administration, e.g., an initial set-up and configuration of the system or a subsequent system-level or user-level reconfiguration.

Other devices not shown in the figures may be associated with the switch 102, such as an adjunct feature server. Such an adjunct may be physically incorporated within the switch, and may be partially or completely implemented using other switch elements such as processor 200 and memory 202. Alternatively, the adjunct may be external to the switch.

The terminals 106 of the system 100 may each be configured to include a processor, an associated memory, and one or more interfaces, arranged in a manner similar to that described above in conjunction with FIG. 2.

The above-cited U.S. patent application Ser. No. 10/072,063 in accordance with one aspect thereof configures a communication system switch such as the switch 102 to provide statistical weighting of call processing scripts.

More particularly, in an illustrative embodiment described in U.S. patent application Ser. No. 10/072,063, calls or other communications are processed in a system switch in accordance with a statistical control mechanism based on the assignment of weightings to call vectors or other processing scripts. The processing scripts specify operations to be performed in processing the communications in the switch, and each of at least a subset of the scripts in a set of processing scripts has an assigned weighting associated therewith. A particular one of the processing scripts is selected for application to a given one of the communications in accordance with the assigned weightings. The assigned weightings are configured to provide a desired usage for each of the processing scripts over a given number of the communications.

The term "script" as used herein is intended to include a call processing vector or other set of program code or instructions executable at least in part by a processing element of the switch 102, e.g., by processor 200 of FIG. 2. For example, a script may be a preprocessing script applied to a particular call in order to determine one or more characteristics of the call utilizable in call routing decisions. The term is also intended to include other types and arrangements of call processing instructions, such as access lists that are applied to outgoing calls or requests to access a network to which the switch is connected. It should be noted that the latter fall within the definition of "call" previously provided herein.

As noted above, an example of a script is a preprocessing script which specifies certain operations to be performed in switch 102 for a given call prior to delivery of the call to a system endpoint, e.g., to one of the terminals 106. Advantageously, the approach described in the above-cited U.S. patent application Ser. No. 10/072,063 allows a statistical distribution of calls to scripts within the switch 102, thereby improving switch processing efficiency and flexibility, and avoiding the problems associated with conventional unweighted script processing. This approach also facilitates call load sharing between distributed switch elements that are networked together. Moreover, this approach permits a simplified implementation of scripts that would otherwise be significantly more complex if implemented using only conventional unweighted script processing techniques.

The present invention in accordance with one aspect thereof provides improvements in a communication system switch having statistical weighting of processing scripts by adjusting the statistical weightings utilizing a feedback control mechanism. Advantageously, the invention facilitates efficient call processing within a high call volume environment, or within an environment where call capacity or some other system performance attribute must be limited or regulated.

Although the invention will be illustrated below in conjunction with the processing of incoming calls, it is to be appreciated that the described techniques are also applicable to outgoing calls, as well as to other types of communications, as was previously noted. In addition, those skilled in the art will recognize that the present invention is suitable for use in data switching systems as well as voice switching systems.

In the examples given below, calls arriving at the switch 102 are acted upon by a script-based pre-processing mechanism before being routed to a destination. As indicated above, this is merely an illustrative processing context in which the invention may be utilized, and should not be construed as limiting the scope of the invention in any way.

By way of introductory explanation, call processing operations utilizing unweighted and weighted processing scripts will be described in conjunction with FIGS. 3A, 3B and 4.

Figure 3A:
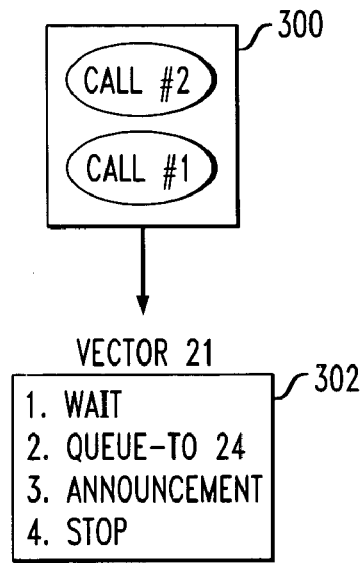
FIGS. 3A and 3B illustrate call processing using an unweighted script and a set of statistically weighted scripts, respectively.

FIG. 3A illustrates an example call processing operation that may be implemented in the FIG. 1 system using an unweighted script. In this example, a set of incoming calls 300 including Call #1, Call #2, etc. is processed by applying a script 302 to each of the calls. The script 302 in this example is a call vector or preprocessing script denoted Vector 21, and includes the following four processing operations:

1. Wait
2. Queue-to 24
3. Announcement
4. Stop

In accordance with the conventional unweighted script practice previously described, Vector 21 is applied to each of the calls in the set of incoming calls 300.

Figure 3B:
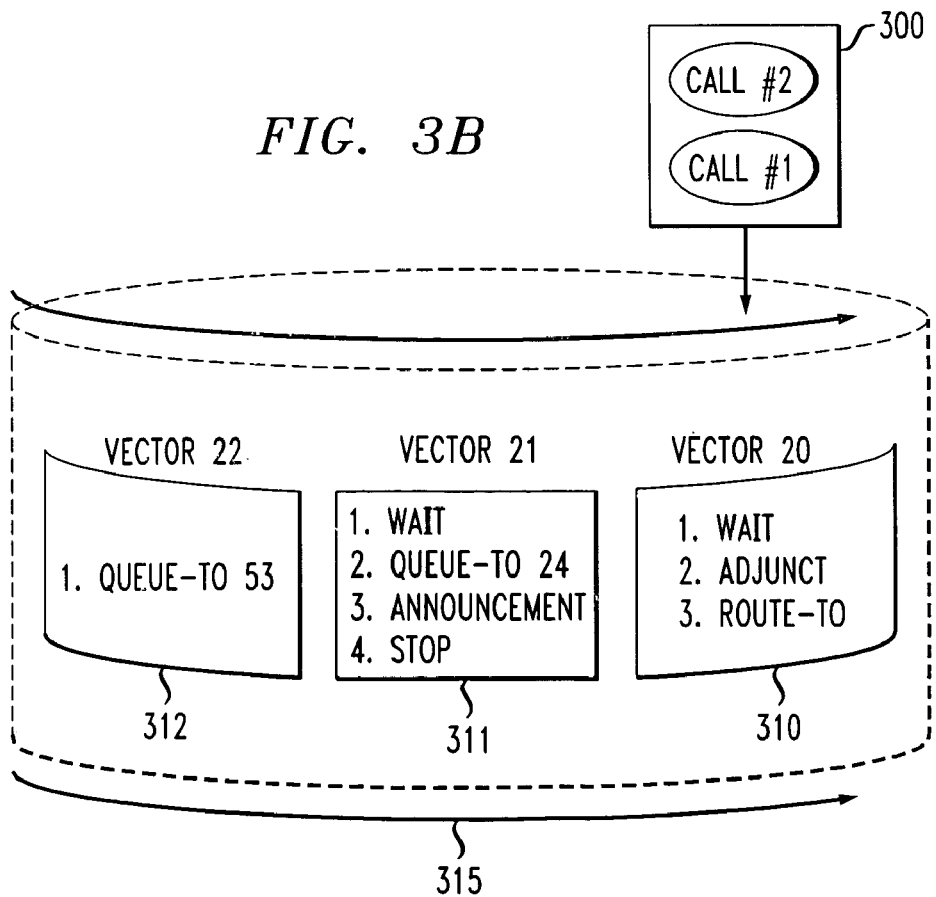

FIG. 3B illustrates an improved approach utilizing statistically weighted scripts as described in the above-cited U.S. patent application Ser. No. 10/072,063. In this example, the incoming calls in the set of calls 300 are delivered in a round-robin manner to different processing scripts. The processing scripts shown in the figure include call vectors or preprocessing scripts 310, 311 and 312, also denoted Vector 20, Vector 21 and Vector 22, respectively. Vector 21 corresponds to script 302 as previously described, and is relabeled as script 311 in FIG. 3B. The script 310 includes the following three processing operations:

1. Wait
2. Adjunct
3. Route-to

The script 312 includes a single processing operation as follows:

1. Queue-to 53

The scripts in FIG. 3B may be viewed illustratively as being arranged on an outer side surface of a "cylinder" shown in dashed lines in the figure. Additional scripts other than those shown may be included in a group of scripts from which scripts are selected in accordance with statistical weighting techniques. A single selected one of the scripts is applied to a particular one of the calls in the set of calls 300, with the selection process proceeding around the cylinder in the direction of the arrow 315. More particularly, if scripts 310, 311 and 312 denote the full set of scripts to be utilized, script 310 is applied to Call #1, with script 312 being applied to Call #2, and so on.

The arrangement illustrated in FIG. 3B allows a statistical weighting of the processing scripts in terms of their application to incoming calls, as will be described in greater detail below. Advantageously, this allows a designated fraction of the incoming calls to be handled by one routing application, such as best split routing (BSR), while other fractions of the calls are handled by other applications. As a result, call processing operations in the switch 102 are made more flexible and efficient, load sharing between distributed switch processing elements is facilitated, and script implementation is simplified.

The particular example processing operations included in the vectors of FIGS. 3A and 3B, as well as those included in other vectors or processing scripts described herein, are of a conventional type well understood to those skilled in the art, and are therefore not described in further detail herein. Additional information regarding these and other processing operations suitable for use in conjunction with the present invention may be found in, e.g., the DEFINITY® ECS Administrator's Guide, Release 9, Document No. 555-233-506, which is incorporated by reference herein, and in the above-cited U.S. Pat. Nos. 5,740,238, 5,754,639 and 6,049,547.

Figure 4:
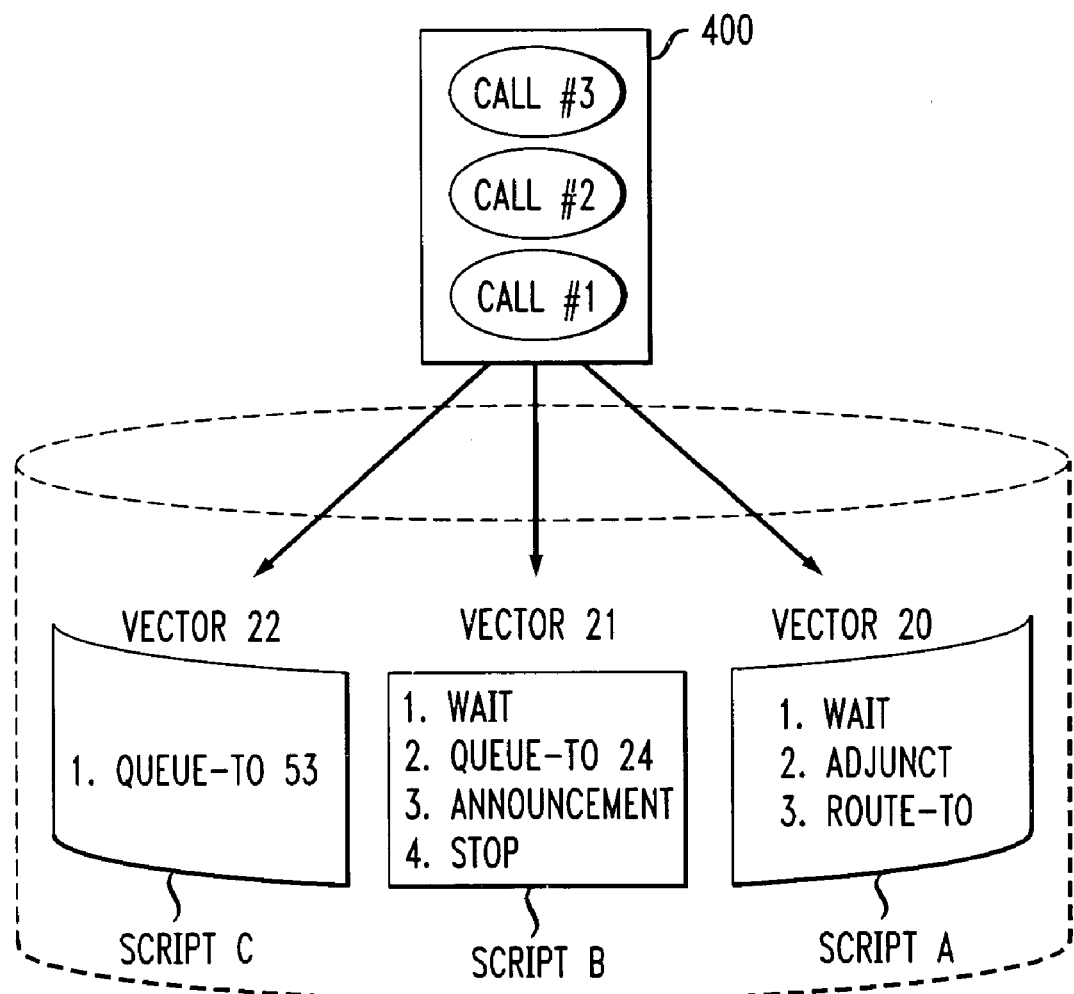
FIG. 4 shows another example of call processing using statistically weighted scripts.

FIG. 4 provides further illustration of the manner in which statistical weighting of processing scripts may be implemented in accordance with the approach described in the above-cited U.S. patent application Ser. No. 10/072,063. The implementation of statistical weighting as described herein will also be referred to generally as a statistical control mechanism. This example uses the same set of call vectors or pre-processing scripts used in FIG. 3B, i.e., Vector 20, Vector 21 and Vector 22. For simplicity of subsequent description, these are denoted as Script A, Script B and Script C, respectively. A set of calls 400 including Call #1, Call #2, Call #3, etc. is processed using the set of scripts in a manner which provides a statistical weighting of the scripts. In this illustration, a weighting is assigned to each of the scripts. For example, a weighting may be assigned to each of the scripts in a system administration screen associated with the switch 102 as follows:

| Script _A_ | Weight _1_ |
|---|---|
| Script _B_ | Weight _1_ |
| Script _C_ | Weight _1_ |
| Script ___ | Weight ___ |

This sample system administration screen allows a user to enter a script and its corresponding weighting. A line or field with no entry is assumed to be "null" and is not considered in call pre-processing. In this example, an equal numerical value, i.e., a value of "1," is assigned to each of the scripts in the set of scripts A, B and C. This provides a substantially equal distribution of the incoming calls among the scripts. More particularly, the system 100 in this example will process the calls as follows:

Step 1: Call #1 enters the system
    Step 2: Call #1 is processed by Script A
    Step 3: Call #2 enters the system
    Step 4: Call #2 is processed by Script B
    Step 5: Call #3 enters the system
    Step 6: Call #3 is processed by Script C
    Step 7: Call #4 enters the system
    Step 8: Call #4 is processed by Script A The next call into the system is processed by Script B, the next call processed by Script C, and so on.

By adjusting the weightings in the system administration screen, one can alter the fraction of calls processed by each of the scripts. For example, the weighting associated with Script B may be changed from "1" to "2" as indicated below.

| Script _A_ | Weight _1_ |
|---|---|
| Script _B_ | Weight _2_ |
| Script _C_ | Weight _1_ |
| Script ___ | Weight ___ |

The resulting call processing is then as follows:

Step 1: Call #1 enters the system
    Step 2: Call #1 is processed by Script A
    Step 3: Call #2 enters the system
    Step 4: Call #2 is processed by Script B
    Step 5: Call #3 enters the system
    Step 6: Call #3 is processed by Script C
    Step 7: Call #4 enters the system
    Step 8: Call #4 is processed by Script B The next call into the system is processed by Script A, the next call processed by Script B, the next call processed by Script C, and so on.

Another example of the effect of adjusting the statistical control mechanism is given below, in which scripts B and C are assigned respective weightings of "3" and "2":

| Script _B_ | Weight _3_ |
|---|---|
| Script _C_ | Weight _2_ |
| Script ___ | Weight ___ |
| Script ___ | Weight ___ |

The resulting call processing is then as follows:

Step 1: Call #1 enters the system
    Step 2: Call #1 is processed by Script B
    Step 3: Call #2 enters the system
    Step 4: Call #2 is processed by Script C Step 5: Call #3 enters the system
Step 6: Call #3 is processed by Script B
Step 7: Call #4 enters the system
Step 8: Call #4 is processed by Script C
Step 9: Call #5 enters the system
Step 10: Call #5 is processed by Script B
Step 11: Call #6 enters the system
Step 12: Call #6 is processed by Script B
Step 13: Call #7 enters the system
Step 14: Call #7 is processed by Script C The next call into the system is processed by Script B, the next call processed by Script C, the next call processed by Script B, and so on.

In the above examples, the weightings are specified as numerical values, i.e., positive integers. Other weighting formats can also be used in implementing the statistical control mechanism. For example, the weightings may be specified as percentage values. More particularly, a percentage value may be specified for one or more of the scripts, as in the following:

| Script _A_ | Percentage 80% |
|---|---|
| Script _B_ | Percentage 20% |

As another example, frequency values may be used, with one or more of the frequency values specifying a desired frequency of utilization for its corresponding processing script:

| Script _A_ | Frequency every 5 seconds |
|---|---|
| Script _B_ | Frequency default |

In the above, Script A will be executed at a rate approximating every five seconds, regardless of the incoming call rate, while Script B is assigned a default value. The default value may be designed such that a script assigned that value is not limited as to its frequency of application. An arrangement of the type described above is particularly useful in a situation in which call rates are very different at different times of the day.

As yet another example, a line-based statistical control mechanism may be implemented in which one or more of the scripts each includes multiple lines of code, and weightings are assigned to the different lines of code, as in the following:

| Script _A/line 1_ | Percentage 28% |
|---|---|
| Script _B/line 3_ | Percentage unconditional |

This arrangement may be applied to any designated line or lines of any of the scripts, in any desired combination. In the above, the indication of "unconditional" for a particular line of a given script specifies that there is no statistical limitation on that line. A specified numerical, percentage or frequency value could also be used.

As indicated previously, the switch 102 may be implemented as an otherwise conventional DEFINITY® ECS communication system switch. This example switch typically utilizes a vector directory number (VDN) to identify a particular vector. As described in the above-cited U.S. patent application Ser. No. 10/072,063, the ECS switch may be modified such that the VDN identifies a list of vectors or scripts from which particular scripts are selected for application to a given call in the manner described previously. A system administration screen or other suitable mechanism may be used to assign weightings for the particular scripts of a given VDN, utilizing the techniques described in conjunction with the previous examples.

The feedback control aspects of the present invention will now be described in greater detail with reference to FIGS. 5 and 6.

In general, a communication system switch such as switch 102 is configurable for use in call processing applications such as automatic call distribution (ACD), customer relationship management (CRM), etc. These and other applications often have associated therewith a number of customer definable call processing scripts. Typically, the more complex of these processing scripts provide more effective processing but require more intensive use of system resources such as CPU time. Although less complex scripts that require less system resource utilization may be available, such scripts may not perform as well as the more complex scripts in meeting call processing performance objectives. Conventional switches do not provide an adequate mechanism for adjusting the selection of particular processing scripts so as to optimize call processing performance.

The present invention addresses this issue by providing feedback control of processing script weightings. By way of example, the invention can significantly improve the call processing ability of the switch by redirecting calls to less CPU intensive processing scripts when CPU utilization is high while also redirecting calls to more CPU intensive processing scripts when CPU utilization is low. In addition to or in place of CPU utilization, the invention may consider other switch performance attributes related to specified call processing objectives, as will be described in greater detail below.

Figure 5:
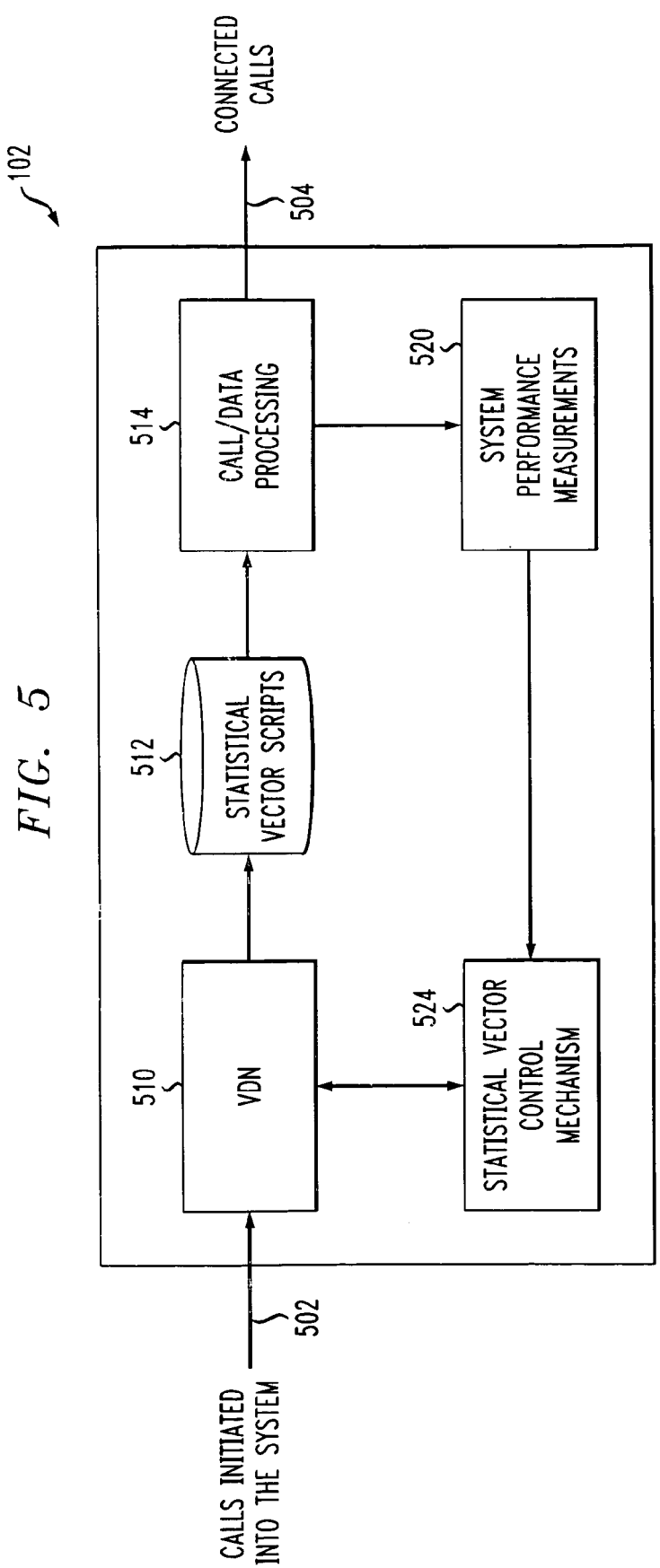
FIG. 5 shows a functional block diagram of the switch of the FIG. 1 system as configured in accordance with an illustrative embodiment of the invention to include feedback control of statistically weighted processing scripts.

FIG. 5 illustrates an example feedback control mechanism as implemented in the switch 102 in accordance with the invention. As previously described, the switch 102 is configured such that one or more processing scripts are selected for application to one or more communications in accordance with weightings assigned to at least a subset of the processing scripts. The feedback control mechanism in FIG. 5 is generally configured to determine measurements of one or more switch resources associated with processing of the communications using the processing scripts, and to adjust one or more of the processing script weightings in accordance with the determined measurements.

The switch 102 as shown in FIG. 5 receives via an input 502 a number of calls that have been initiated into the system 100. One or more of the calls are connected by the switch via an output 504 to terminals or other call destinations of the system. A VDN selection element 510 identifies a list of vectors or scripts from which particular scripts are selected for application to a given call in the manner described previously. The particular vector scripts are stored in memory 512, which may represent a portion of the switch memory 202 of FIG. 2, and selected therefrom by the VDN selection element 510 based on assigned statistical weightings. Element 514 performs data processing or other call processing operations, in accordance with the selected vector scripts, in order to provide appropriate connection of calls via the output 504.

The switch 102 further includes a feedback path from the processing element 514 to the VDN selection element 510. The feedback path includes a system performance measurement element 520 coupled to a statistical vector control mechanism 524. Element 520 obtains system performance measurements based on the processing operations performed by element 514, and supplies information regarding those measurements to the statistical vector control mechanism 524. The statistical vector control mechanism 524 utilizes the information received from element 520 to adjust the statistical weightings associated with various processing scripts selectable by the VDN selection element 510.

It is assumed in this example embodiment that the statistical weightings are controlled by or otherwise accessible to the VDN selection element 510. This is by way of illustration only, and other configurations of switch elements may be used to adjust the weightings associated with the processing scripts.

Elements 510, 514, 520 and 524 of the switch 102 as shown in FIG. 5 may be implemented at least in part in the form of one or more software programs stored in switch memory 202 and executable by switch processor 200.

Figure 6:
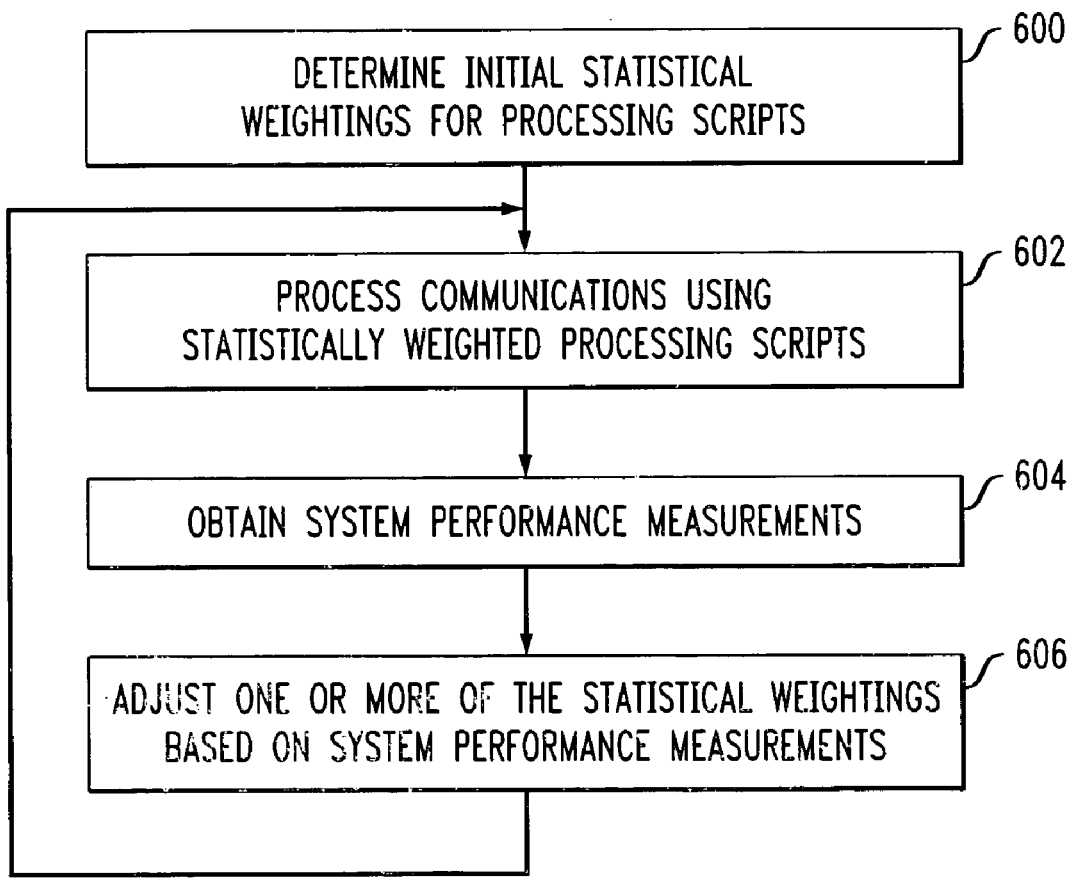
FIG. 6 is a flow diagram of a feedback control process implemented in the switch of the FIG. 1 system in accordance with the present invention.

FIG. 6 is a flow diagram of the general feedback control process implemented in the switch 102 as shown in FIG. 5. The process includes steps 600, 602, 604 and 606. In step 600, the process determines initial statistical weightings for one or more different sets or other groupings of processing scripts. For example, initial statistical weightings may be determined for scripts associated with a number of different VDNs. Calls or other communications are then processed in step 602 using particular ones of the processing scripts selected in accordance with their assigned weightings. System performance measurements, such as CPU utilization or other example measurements to be described below, are then obtained in step 604. Based on the obtained measurements, one or more of the statistical weightings are adjusted in step 606 in order to meet desired system performance objectives. The process then returns to step 602 to continue processing the communications. Steps 604 and 606 are repeated periodically, e.g., at regular intervals, when specified operating conditions are met, or at other designated times, to thereby ensure optimum system performance under varying call processing loads.

The system performance measurements implemented by element 520 in FIG. 5 may be generally characterized as comprising resource limit measurements, business objective measurements, or other types of measurements.

Examples of resource limit measurements suitable for use with the techniques of the present invention include without limitation CPU utilization, link status, link utilization and internal system message queue length. The link status and link utilization measurements may relate to links between the communication system switch and one or more adjuncts or other system elements external to the switch, such as computer-telephony integration (CTI) links, interactive voice response (IVR) links, etc., as well as or alternatively to internal communication links between elements of the communication system switch itself. More particular examples of CTI, IVR and internal communication links in the context of the above-noted DEFINITY® switch include adjunct-switch applications interface (ASAI) links, Conversant links, and expansion interface (EI) links, respectively.

Examples of business objective measurements include without limitation number of calls waiting, oldest call waiting, expected wait time (EWT), most idle agent (MIA), and per site queue length in a multi-site implementation. Other types of system performance measures may be used. Techniques for generating such measures are generally well known to those skilled in the art, and are therefore not further described herein.

In order to meet a desired level of performance, the switch 102 periodically adjusts the statistical weightings of the processing scripts such that the switch applies scripts of greater complexity to particular portions of the incoming communications in situations where system resources are available for use as determined from the system resource measurements, while similarly applying scripts of lesser complexity to particular portions of the incoming communications in situations where system resources are limited.

A suitable weight adjusting algorithm may be implemented in element 524 of the switch 102 in order to derive appropriate weight adjustments from the measurement information supplied by element 520. Numerous algorithms of this type will be readily apparent to those skilled in the art given the teachings provided herein, and are therefore not described in further detail. As indicated above, such a weight adjusting algorithm may be configured to run periodically, with a given set of weight adjustments determined from one run of the algorithm remaining in force until the next run. Initial weightings referred to in step 600 of the FIG. 6 flow diagram may be based on recommended values for given system operating conditions.

Advantageously, the invention significantly improves call processing efficiency and reliability in a communication system switch.

Although the system performance measurements in the FIG. 5 system are shown as being generated within the switch 102, this is by way of example only. The invention can also or alternatively be implemented at least in part using performance information which is generated externally to the switch, e.g., in an external adjunct that operates in conjunction with the switch. As a more particular example, consider a system in which certain call processing operations are implemented at least in part in an external adjunct. In situations in which the adjunct becomes fully utilized or is in a failed state, the invention provides the ability to automatically redirect calls to other processing scripts that do not require the external adjunct for call processing. This provides an additional level of failure protection and thus further improves call processing reliability.

The invention is also applicable to a tenant partitioning implementation wherein the switch is configured such that system resource utilization may be apportioned and therefore limited on a per tenant basis, allowing tenants to subscribe to varying amounts of available system resources. In such an arrangement, particular tenants may be identified by a tenant partitioning identifier (TN), as is well known.

The feedback control mechanism of the present invention can be used in conjunction with existing switch control systems, such as a control system in the above-noted DEFINITY® ECS switch that is used to shed low priority processes, e.g., system maintenance processes, when high priority processes become more demanding upon system resources.

The invention can be used in other queuing, routing or processing operations in a wide variety of communication system switch applications.

The invention can also be used to facilitate call distribution or load sharing across multiple processing element locations in a distributed switch of a multi-site call center.

As previously noted, the call processing functions described above in conjunction with the illustrative embodiments of the invention may be implemented in whole or in part in the switch 102, e.g., in call processing software thereof utilizing processor 200 and memory 202. Other suitable configurations of hardware, software or both may be used to implement the call processing functions of the invention.

It should again be emphasized the above-described embodiments are illustrative only. Alternative embodiments may utilize different switch and terminal configurations, different types and arrangements of call processing scripts, and different weight assignment formats and adjustment techniques. These and numerous other alternative embodiments within the scope of the following claims will be apparent to those skilled in the art.

What is claimed is:

1. A method of processing communications in a communication system switch in which one or more processing scripts are selected for application to one or more communications in accordance with weightings assigned to at least a subset of the processing scripts, the method comprising the steps of:

determining measurements of one or more switch resources associated with processing of the communications using the processing scripts; and adjusting one or more of the processing script weightings in accordance with the determined measurements.

2. The method of claim 1 wherein the measurements comprise one or more resource limit measurements.

3. The method of claim 2 wherein the one or more resource limit measurements comprise at least one of a processor utilization measurement, a link status measurement, a link utilization measurement and an internal system message queue length measurement.

4. The method of claim 3 wherein the link status and link utilization measurements relate to at least one of a CTI link between the switch and another system element, an IVR link between the switch and another system element, and an internal communication link between elements of the switch.

5. The method of claim 1 wherein the measurements comprise one or more business objective measurements.

6. The method of claim 5 wherein the one or more business objective measurements comprise at least one of a number of calls waiting measurement, an oldest call waiting measurement, an expected wait time measurement, a most idle agent measurement, and a per site queue length measurement.

7. The method of claim 1 wherein the determining and adjusting steps are implemented in a feedback path coupled between a communication processing element of the switch and a script selection element of the switch.

8. The method of claim 1 wherein the measurements are determined at least in part externally to the switch.

9. The method of claim 1 wherein the adjusting step is implemented at least in part in a vector directory number (VDN) selection element of the switch.

10. The method of claim 1 wherein the communication system switch comprises a distributed switch having multiple processing elements associated therewith, the assigned weightings providing a desired distribution of communication processing operations across the multiple processing elements.

11. A communication system switch for processing communications, the switch comprising:

a memory for storing weightings assigned to a set of processing scripts, the processing scripts specifying operations to be performed in processing the communications in the switch, such that each of at least a subset of the scripts in the set of processing scripts has a weighting associated therewith; and a processor coupled to the memory, the processor being operative to select a particular one of the processing scripts for application to a given one of the communications in accordance with the assigned weightings;

wherein measurements of one or more switch resources associated with processing of the communications using the processing scripts are determined, and one or more of the processing script weightings are adjusted in accordance with the determined measurements.

12. An article of manufacture comprising a machine-readable storage medium storing one or more programs for use in processing communications in a communication system switch in which one or more processing scripts are selected for application to one or more communications in accordance with weightings assigned to at least a subset of the processing scripts, wherein the one or more programs when executed implement the steps of:

determining measurements of one or more switch resources associated with processing of the communications using the processing scripts; and adjusting one or more of the processing script weightings in accordance with the determined measurements.

* * * * *